United States Patent
Yamane et al.

(10) Patent No.: US 10,286,554 B2
(45) Date of Patent: May 14, 2019

(54) ELECTRIC APPARATUS MOUNTING DEVICE AND METHOD

(71) Applicant: KAWASAKI JUKOGYO KABUSHIKI KAISHA, Kobe-shi, Hyogo (JP)

(72) Inventors: Hideshi Yamane, Kakogawa (JP); Jun Takebayashi, Kakogawa (JP); Shuhei Kuraoka, Akashi (JP); Hiroyuki Mizumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/575,523

(22) PCT Filed: May 12, 2016

(86) PCT No.: PCT/JP2016/064200
§ 371 (c)(1),
(2) Date: Nov. 20, 2017

(87) PCT Pub. No.: WO2016/186009
PCT Pub. Date: Nov. 24, 2016

(65) Prior Publication Data
US 2018/0141215 A1    May 24, 2018

(30) Foreign Application Priority Data
May 20, 2015    (JP) .................. 2015-103002

(51) Int. Cl.
*B25J 9/16*    (2006.01)
*B23P 19/04*    (2006.01)
(Continued)

(52) U.S. Cl.
CPC .............. *B25J 9/1687* (2013.01); *B23P 19/04* (2013.01); *B23P 19/107* (2013.01);
(Continued)

(58) Field of Classification Search
CPC .. B23P 19/107; B25J 15/0019; B25J 15/0433; B25J 19/0033; B25J 9/1035; B25J 9/1687; G05D 15/01
See application file for complete search history.

(56) References Cited

U.S. PATENT DOCUMENTS

| 4,621,398 A | 11/1986 | Kleiman |
| 6,116,966 A | 9/2000 | Little et al. |

(Continued)

FOREIGN PATENT DOCUMENTS

| JP | H06-039767 A | 2/1994 |
| JP | H11-339875 A | 12/1999 |
| JP | 2013-193155 A | 9/2013 |

OTHER PUBLICATIONS

Jul. 19, 2016 International Search Report issued in International Patent Application No. PCT/JP2016/064200.

*Primary Examiner* — Muhammad S Islam
(74) *Attorney, Agent, or Firm* — Oliff PLC

(57) ABSTRACT

This electric apparatus mounting device includes: a robot side contact jig which is provided to an end effector mounted to an arm of a robot and which has a robot side contact; and an electric apparatus side contact jig which is detachably provided to an electric apparatus and which has an electric apparatus side contact electrically connected with the electric apparatus. The robot side contact jig and the electric apparatus side contact jig are configured such that the robot side contact and the electric apparatus side contact are in a connection state in a state that the electric apparatus is held by the end effector. Thus, a work for conveying and mounting an electric apparatus such as a motor to a given position using a robot can be performed without hindrance.

20 Claims, 16 Drawing Sheets

(51) Int. Cl.
*B23P 19/10* (2006.01)
*B25J 9/10* (2006.01)
*B25J 15/00* (2006.01)
*G05D 15/01* (2006.01)
*B25J 15/04* (2006.01)
*B25J 19/00* (2006.01)

(52) U.S. Cl.
CPC ......... *B25J 9/1035* (2013.01); *B25J 15/0019* (2013.01); *B25J 15/0433* (2013.01); *B25J 19/0033* (2013.01); *G05D 15/01* (2013.01)

(56) References Cited

U.S. PATENT DOCUMENTS

| | | | |
|---|---|---|---|
| 2003/0192758 A1* | 10/2003 | Murata | B25J 9/1674 188/382 |
| 2013/0006422 A1* | 1/2013 | Komatsu | B25J 9/1638 700/258 |

* cited by examiner

ELECTRIC APPARATUS MOUNTING DEVICE AND METHOD

TECHNICAL FIELD

The present invention relates to an electric apparatus mounting device and method for conveying electric apparatus such as a motor using a robot and mounting the same to a given position.

BACKGROUND ART

Recently, a system for automating a production process by making a robot to do various works which were conventionally performed by a worker is broadly made practicable (Patent document 1).

For example, in a work for mounting a relatively heavy apparatus to a given position in a product in production, conventionally the apparatus is lifted by a hoist or the like and a worker moves it to a given position and fixes the apparatus to the product in production by a bolt or the like, while there is a system to make a robot to do this conveyance work of the apparatus instead.

Now, when mounting a motor to the product in production, there are cases when the state of the motor needs to be changed in order to perform the mounting work without hindrance. For example, when the product in production is a robot (hereunder, the robot to be produced is referred to as "product robot"), and a servo motor for driving an arm of the product robot is mounted to a given position of the product robot using a robot for work (hereunder, the working robot used for producing the product robot is referred to as "work robot"), there are cases when an electromagnetic brake of the servo motor needs to be temporarily un-locked.

Thus, in the product robot to which the servo motor is fixed by the fixing bolt, when the servo motor is conveyed by the work robot and it is mounted to a drive shaft of the product robot, the fixing bolt needs to be inserted into a screw hole by inserting an output shaft of the servo motor into an insertion hole provided on the product robot side so as to make a gear on the drive shaft side and a gear on a distal end of the output shaft to engage with each other, and also rotating the motor body about an axis of the output shaft so as to position a screw hole provided on the product robot body side and a hole for the fixing bolt provided on the motor body side.

However, in the servo motor to be mounted to the drive shaft of the product robot, generally a non-exciting operation type electromagnetic brake is provided in order to prevent runaway of the robot at the loss of the power source and falling-off of objects to be conveyed.

When a servo motor with such non-exciting operation type electromagnetic brake is mounted to the drive shaft of the product robot, the motor output shaft is fixed or restrained to the motor main body and cannot be rotated, since power supply is not supplied to the servo motor.

Accordingly, when the output shaft of the servo motor with the non-exciting operation type electromagnetic brake is inserted into a hole provided on the drive shaft side of the product robot and the gear on the drive shaft side and the gear on the motor output shaft side are engaged with each other, the motor main body cannot be rotated and the position of its fixing bolt hole cannot be positioned to the screw hole on the robot side, since the motor output shaft and the motor main body are restrained.

Therefore, when performing work for mounting the servo motor with the non-exciting operation type electromagnetic brake to the drive shaft of the product robot, it is necessary to actuate the electromagnetic brake until the output shaft of the servo motor is inserted into the hole provided on the robot drive shaft side and the gear on the drive shaft side and the gear on the motor output shaft side are engaged with each other, and un-lock the electromagnetic brake after the gear on the drive shaft side and the gear on the motor output shaft side are engaged with each other so that the motor main body can be rotated about the motor output shaft.

Note that, when a worker mounts the servo motor as in a conventional manner, the attitude of the product robot (angle of the robot arm, or the like) can be changed more or less in production. Therefore, the position of the fixing bolt hole of the motor main body can be aligned to the position of the screw hole on the robot side by changing the attitude of the product robot more or less in the state that the gear on the drive shaft side of the product robot and the gear on the motor output shaft side are engaged with each other.

In contrast, when the product robot is produced using the work robot, the attitude of the product robot in production is firmly fixed since parts such as the motor need to be mounted to a previously taught position. Therefore, the position of the fixing bolt hole on the motor main body side and the position of the screw hole on the robot side cannot be aligned to each other by changing the attitude of the product robot in the state that the gear on the drive shaft side of the product robot and the gear on the motor output shaft side are engaged with each other.

Moreover, even when the object to which the motor is mounted by the work robot is another product not the product robot, the motor main body cannot be rotated in the state that the gear on the product side and the gear on the motor output shaft side are engaged with each other unless the brake of the motor is un-locked, when the gear on the product side is in a fixed state.

Moreover, there are cases when the electric apparatus need to be operated so as to change its state in the middle of conveyance/mounting work by the work robot even when the object to be conveyed by the work robot is an electric apparatus other than the motor. However, the conventional technique cannot respond to such demand.

CITATION LIST

Patent Document

[Patent Document 1] Japanese Patent Application Laid-Open No. 2013-193155

SUMMARY OF INVENTION

Objects to be Achieved by the Invention

The present invention is made considering the above-mentioned problem of the conventional technique, and its object is to provide an electric apparatus mounting device and method capable of performing a work for conveying and mounting an electric apparatus such as a motor to a given position using a robot without hindrance.

Mean for Achieving the Objects

In order to achieve the objects above, a first aspect of the present invention is an electric apparatus mounting device for conveying and mounting an electric apparatus to a given position using a robot, comprising: an robot side contact jig which is provided to an end effector mounted to an arm of the robot and which has a robot side contact; and an electric apparatus side contact jig which is detachably provided to the electric apparatus and which has an electric apparatus side contact electrically connected with the electric apparatus, wherein the robot side contact jig and the electric apparatus side contact jig are configured such that the robot side contact and the electric apparatus side contact are in a connection state in a state that the electric apparatus is held by the end effector.

A second aspect of the present invention is that, in the first aspect, the electric apparatus includes a motor.

A third aspect of the present invention is that, in the second aspect, the electric apparatus side contact is electrically connected to an electromagnetic brake of the motor.

A fourth aspect of the present invention is that, in the third aspect, the electromagnetic brake is a non-exciting operation type electromagnetic brake, wherein the robot side contact is electrically connected to a power source for supplying a power for un-locking the non-exciting operation type electromagnetic brake.

A fifth aspect of the present invention is that, in any one of the second to fourth aspects, the electric apparatus side contact is electrically connected to a rotational drive mechanism of the motor.

A sixth aspect of the present invention is that, in any one of the first to fifth aspects, the robot side contact is electrically connected to a controller of the robot.

In order to achieve the objects above, a seventh aspect of the present invention is an electric apparatus mounting method for conveying and mounting an electric apparatus to a given position using a robot, comprising: a contact connecting step to drive the robot and connect a robot side contact of a robot side contact jig provided to an end effector mounted to an arm of the robot to an electric apparatus side contact of an electric apparatus side contact jig detachably provided to the electric apparatus; a motor conveying step to drive the robot and convey the electric apparatus held by the end effector; and a power supplying step to supply a power from a power supply electrically connected to the robot side contact to the electric apparatus.

An eighth aspect of the present invention is that, in the seventh aspect, the electric apparatus includes a motor, wherein an electromagnetic brake of the motor is un-locked by the power supplying step.

A ninth aspect of the present invention is that, the eighth aspect further comprises a motor main body positioning step to drive the robot after un-locking the electromagnetic brake of the motor by the power supplying step and rotate a main body of the motor about an axis of an output shaft of the motor so as to position the main body of the motor.

A tenth aspect of the present invention is that, in any one of the seventh to ninth aspects, the power supply in the power supplying step is provided by a controller of the robot.

Advantageous Effect of the Invention

According to the present invention, an electric apparatus mounting device and method capable of performing a work for conveying and mounting an electric apparatus such as a motor to a given position using a robot without hindrance can be provided.

EMBODIMENT OF THE INVENTION

Figure 1:
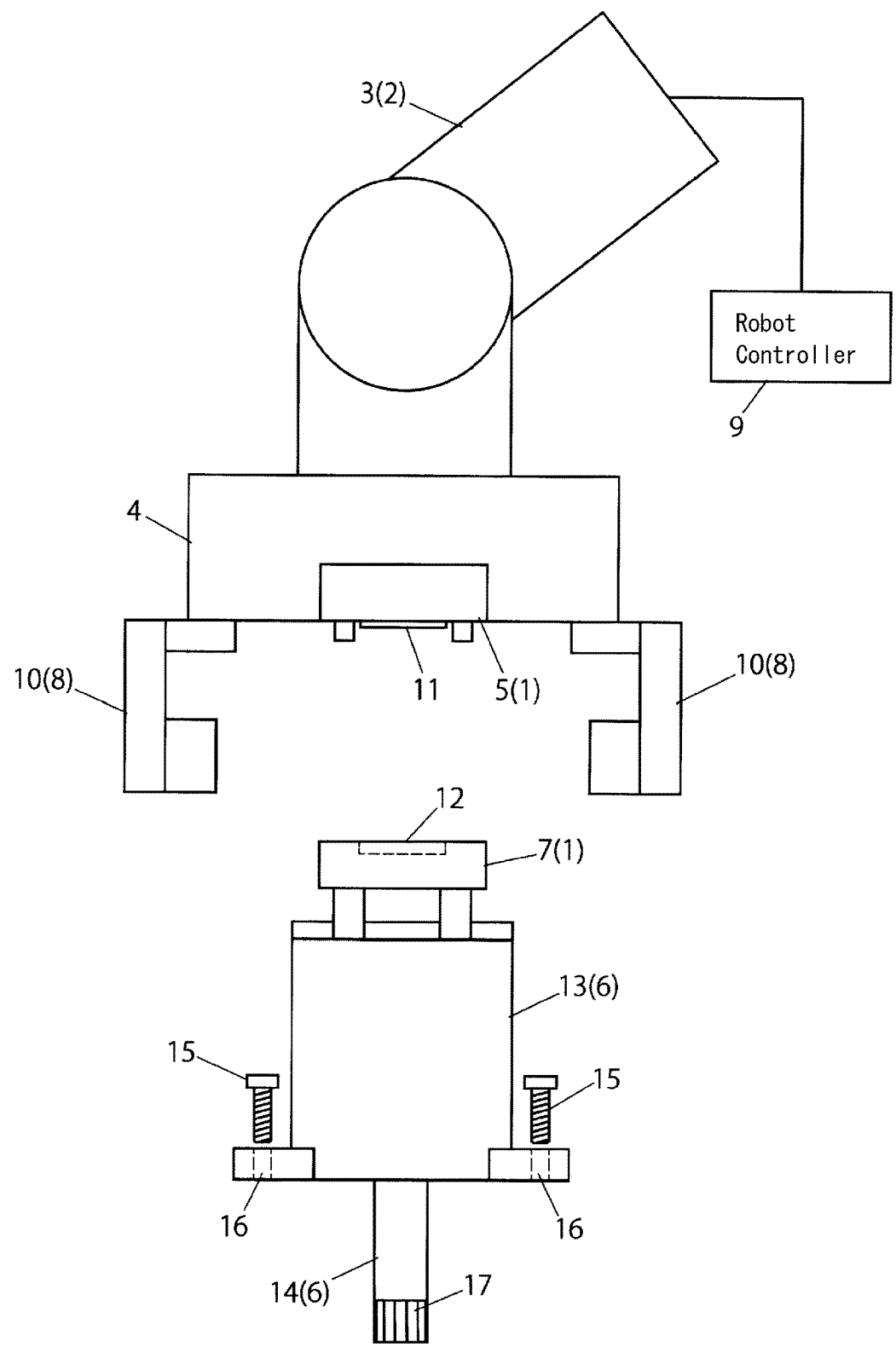
FIG. 1 is a front view schematically illustrating a motor mounting device according to one embodiment of the present invention together with a servo motor.

Hereunder, a motor mounting device (electric apparatus mounting device) and a motor mounting method (electric apparatus mounting method) according to one embodiment of the present invention will be described referring to the drawings.

Figure 2:
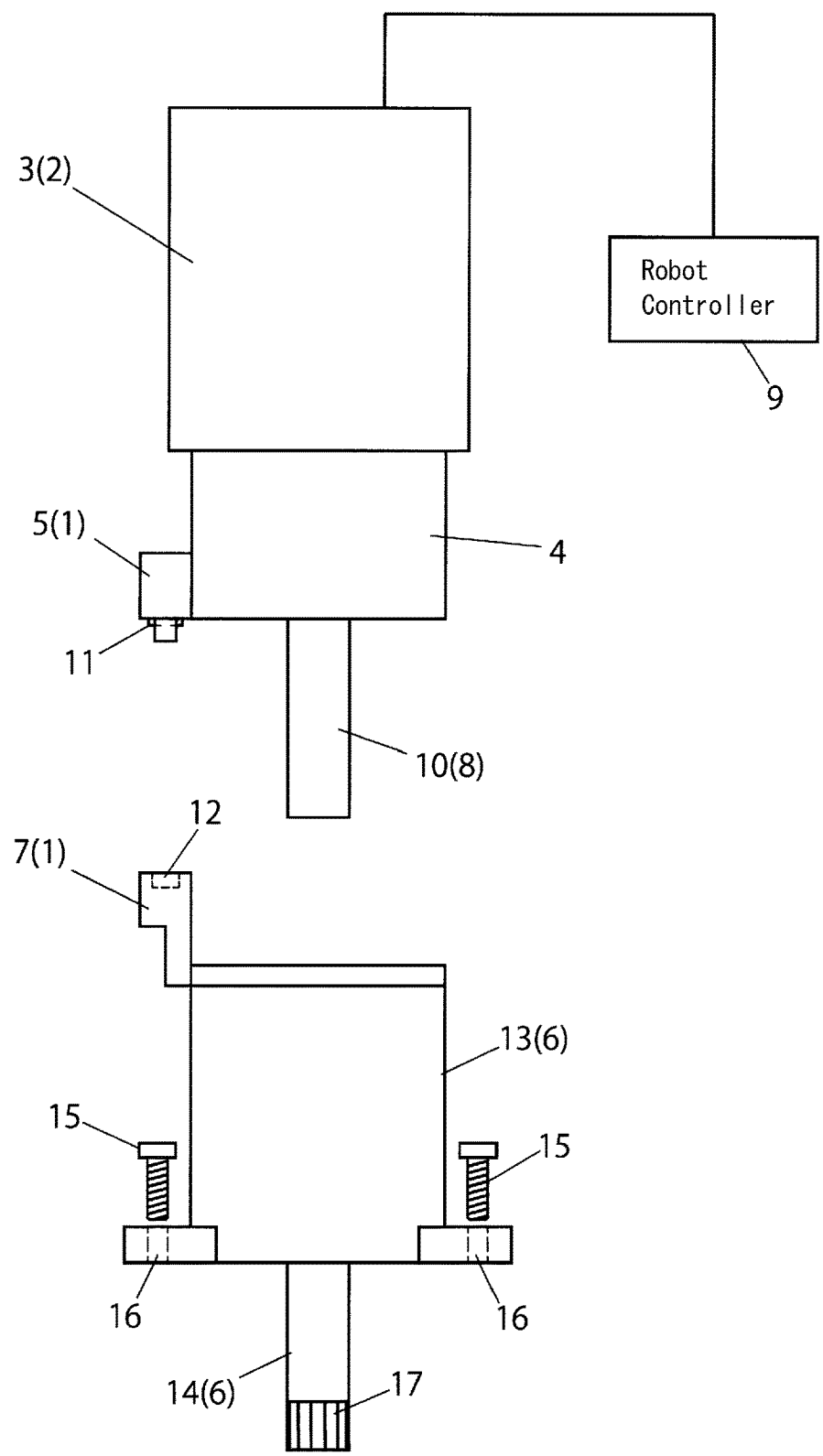
FIG. 2 is a side view schematically illustrating the motor mounting device according to one embodiment of the present invention together with the servo motor.
Figure 3A:
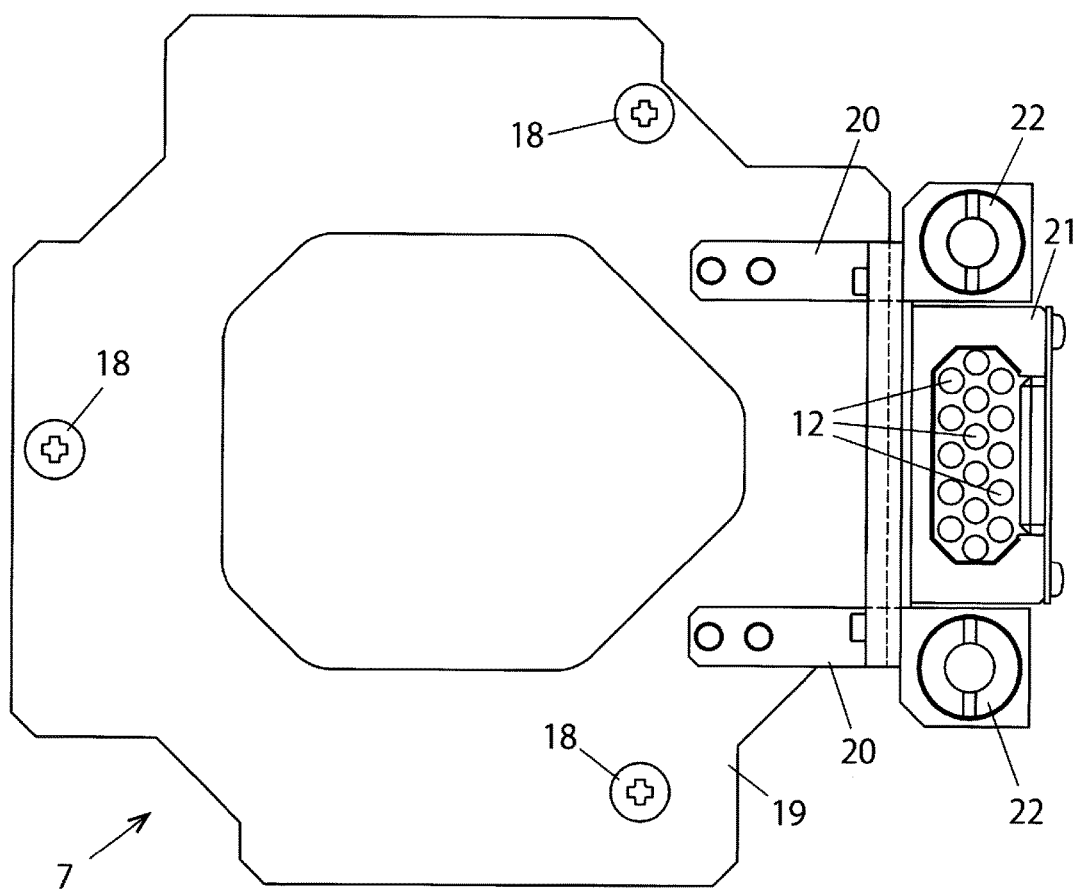
FIG. 3A is a plan view illustrating a motor side contact jig of the motor mounting device illustrated in FIG. 1.
Figure 3B:
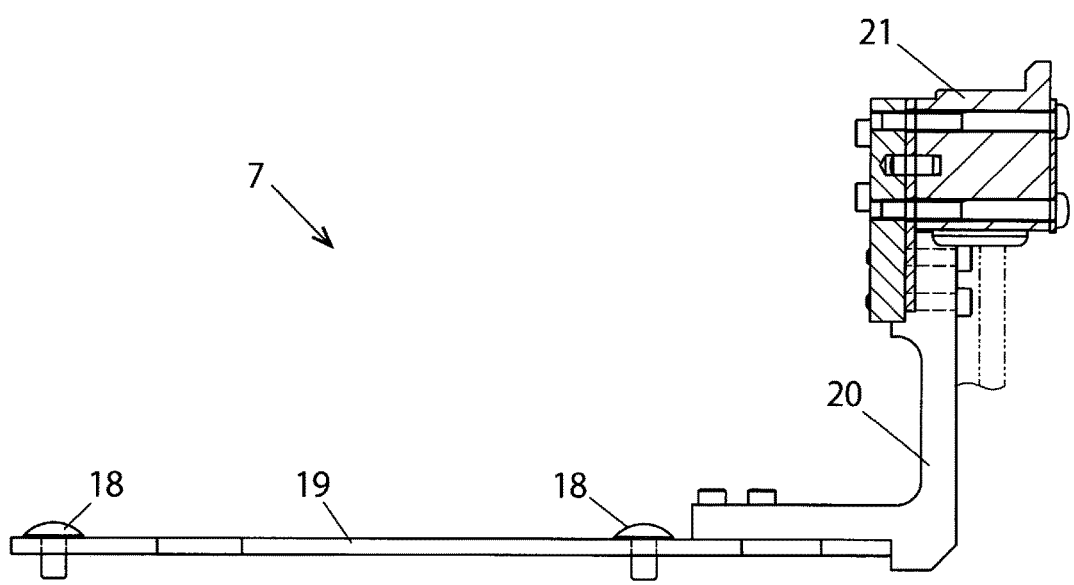
FIG. 3B is a side view of the motor side contact jig illustrated in FIG. 3A.
Figure 3C:
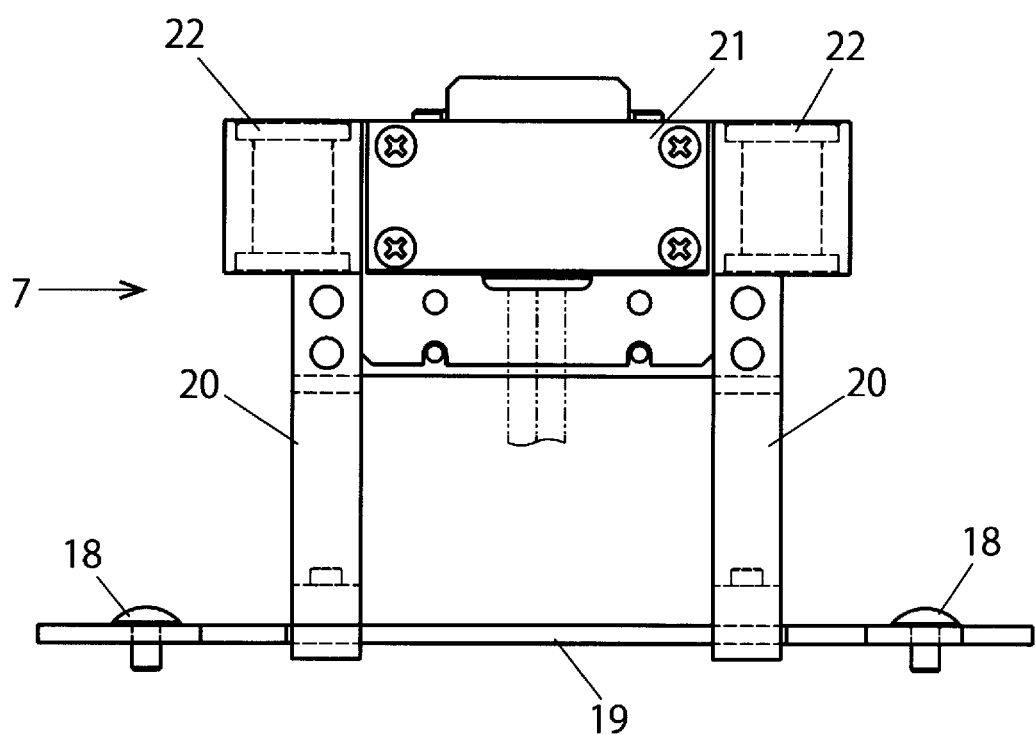
FIG. 3C is a front view of the motor side contact jig illustrated in FIG. 3A.
Figure 4A:
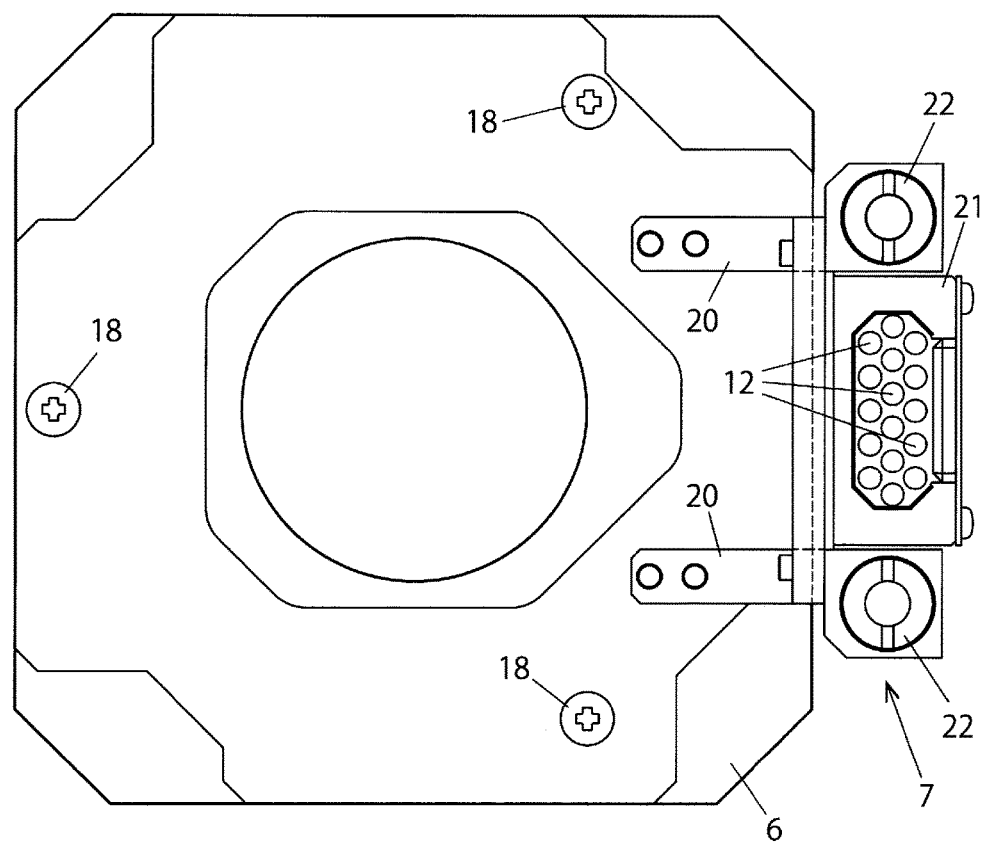
FIG. 4A is a plan view illustrating a state that the motor side contact jig illustrated in FIG. 3A is mounted to the servo motor.
Figure 4B:
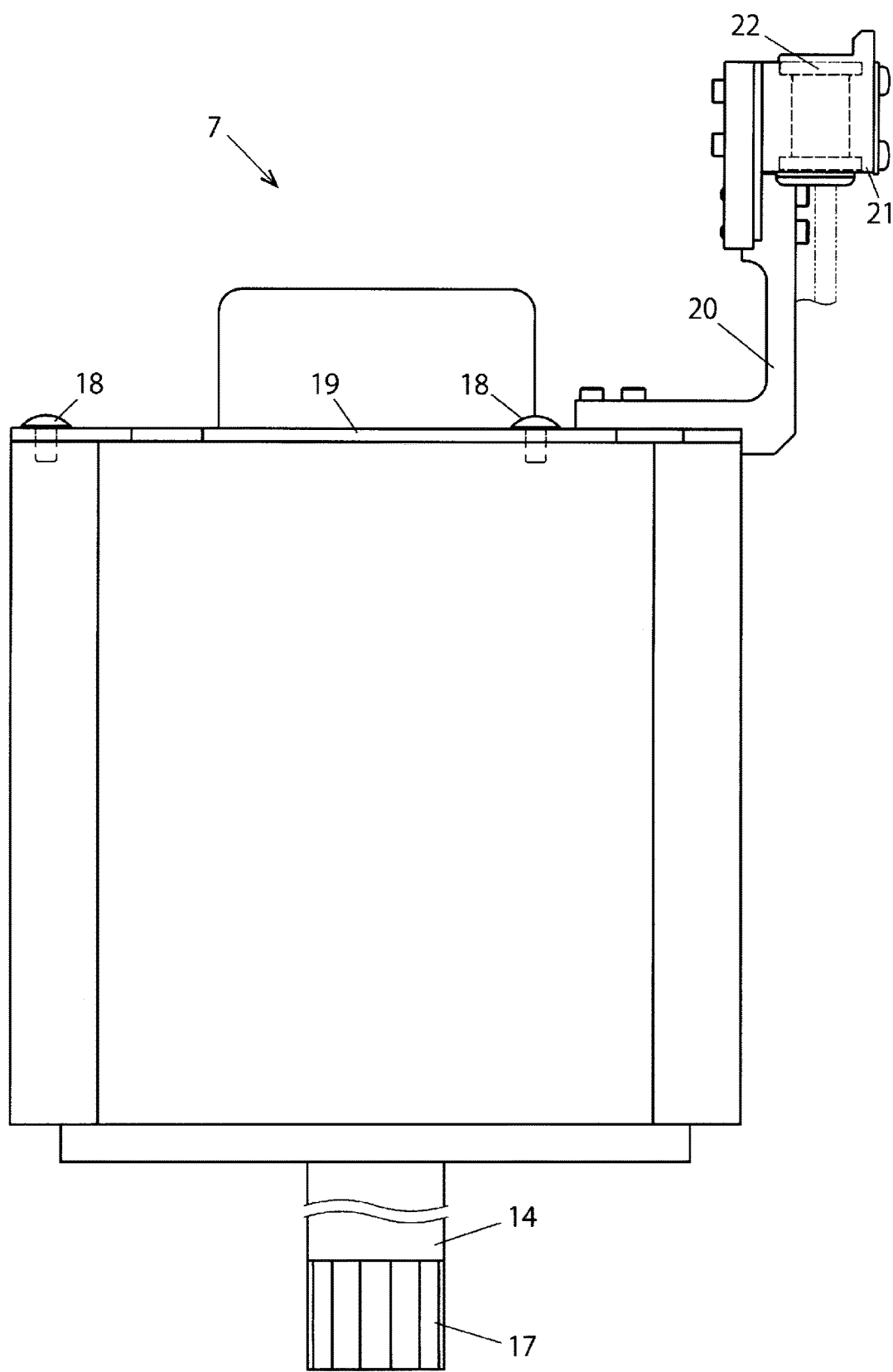
FIG. 4B is a side view illustrating the state that the motor side contact jig illustrated in FIG. 3A is mounted to the servo motor.
Figure 4C:
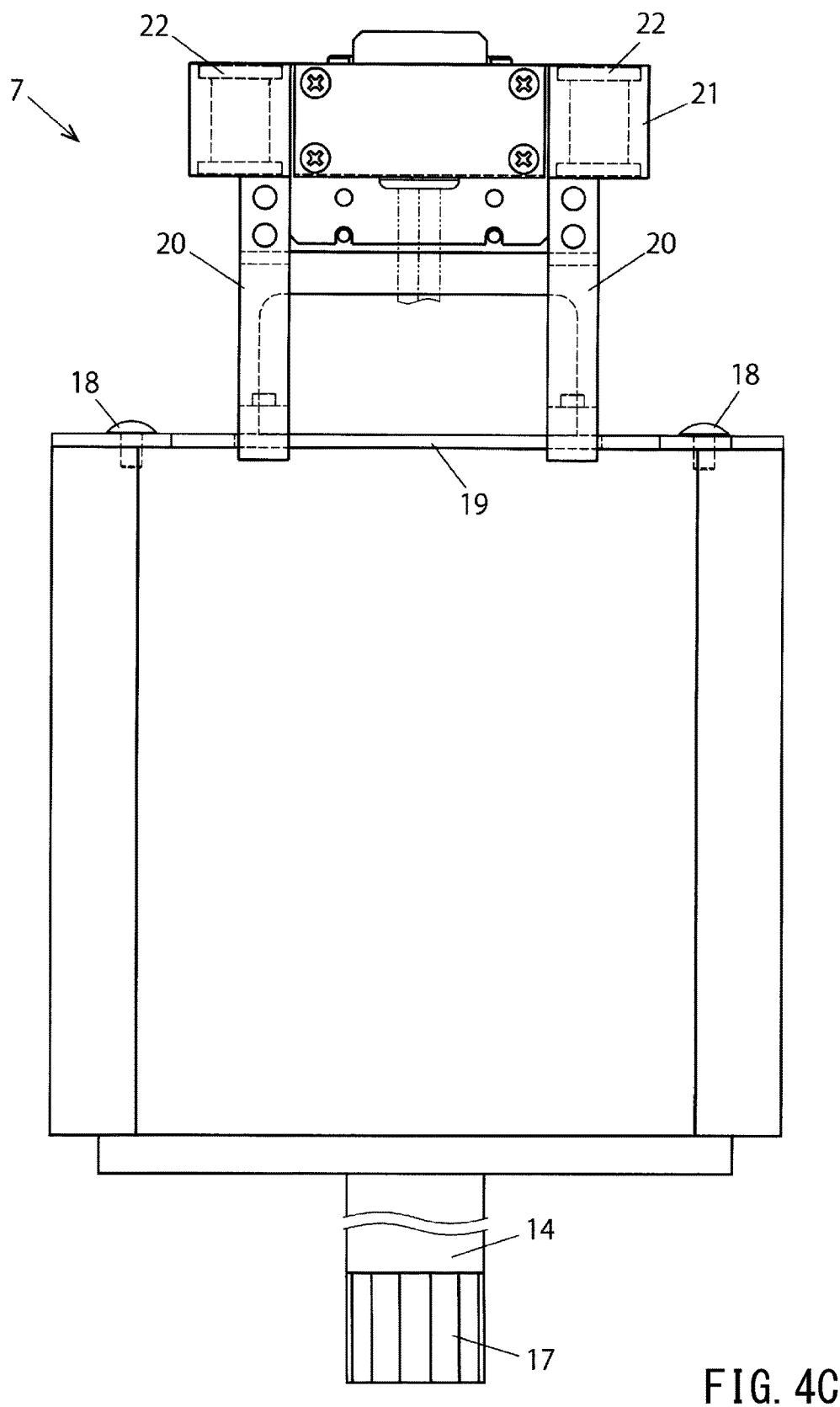
FIG. 4C is a front view illustrating the state that the motor side contact jig illustrated in FIG. 3A is mounted to the servo motor.
Figure 5A:
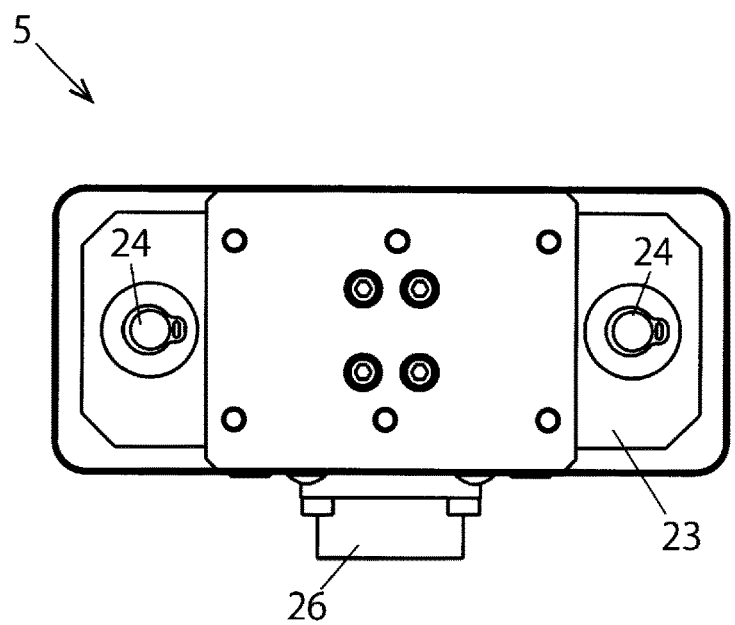
FIG. 5A is a plan view illustrating a robot side contact jig of the motor mounting device illustrated in FIG. 1.
Figure 5B:
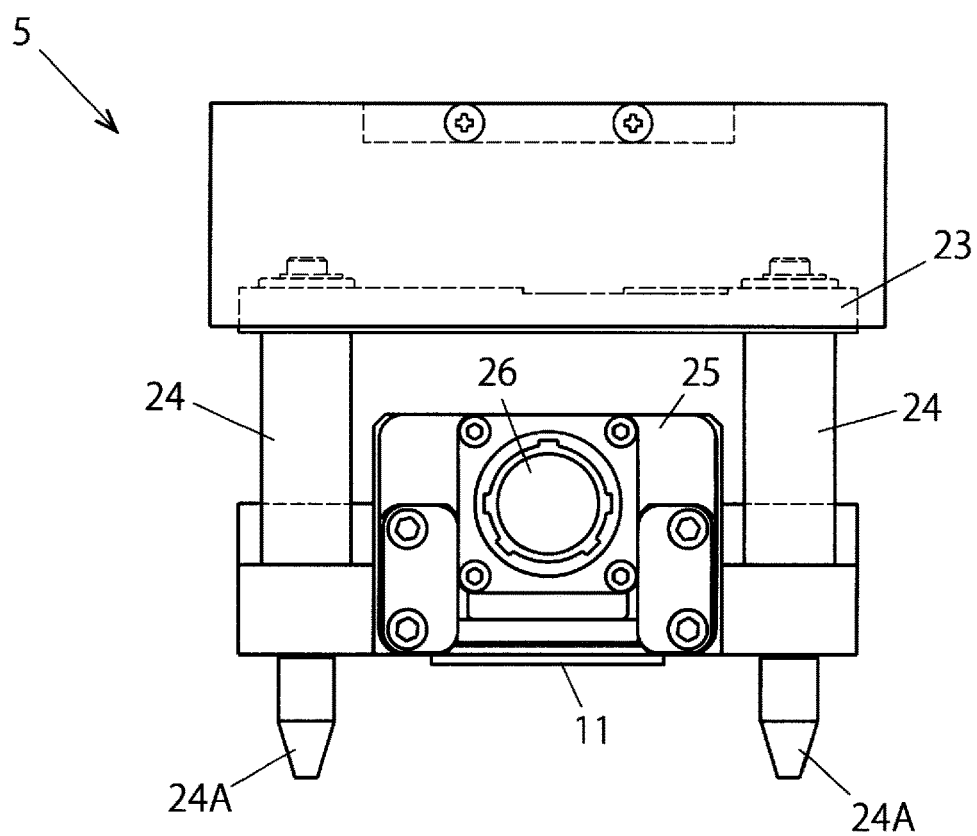
FIG. 5B is a front view of the robot side contact jig illustrated in FIG. 5A.
Figure 5C:
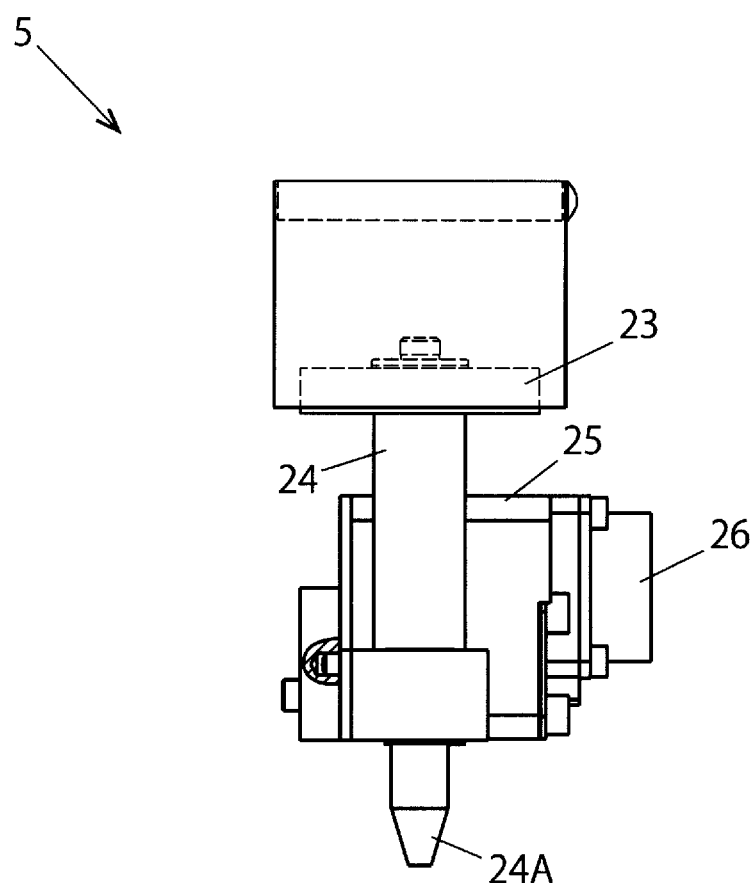
FIG. 5C is a side view of the robot side contact jig illustrated in FIG. 5A.
Figure 6A:
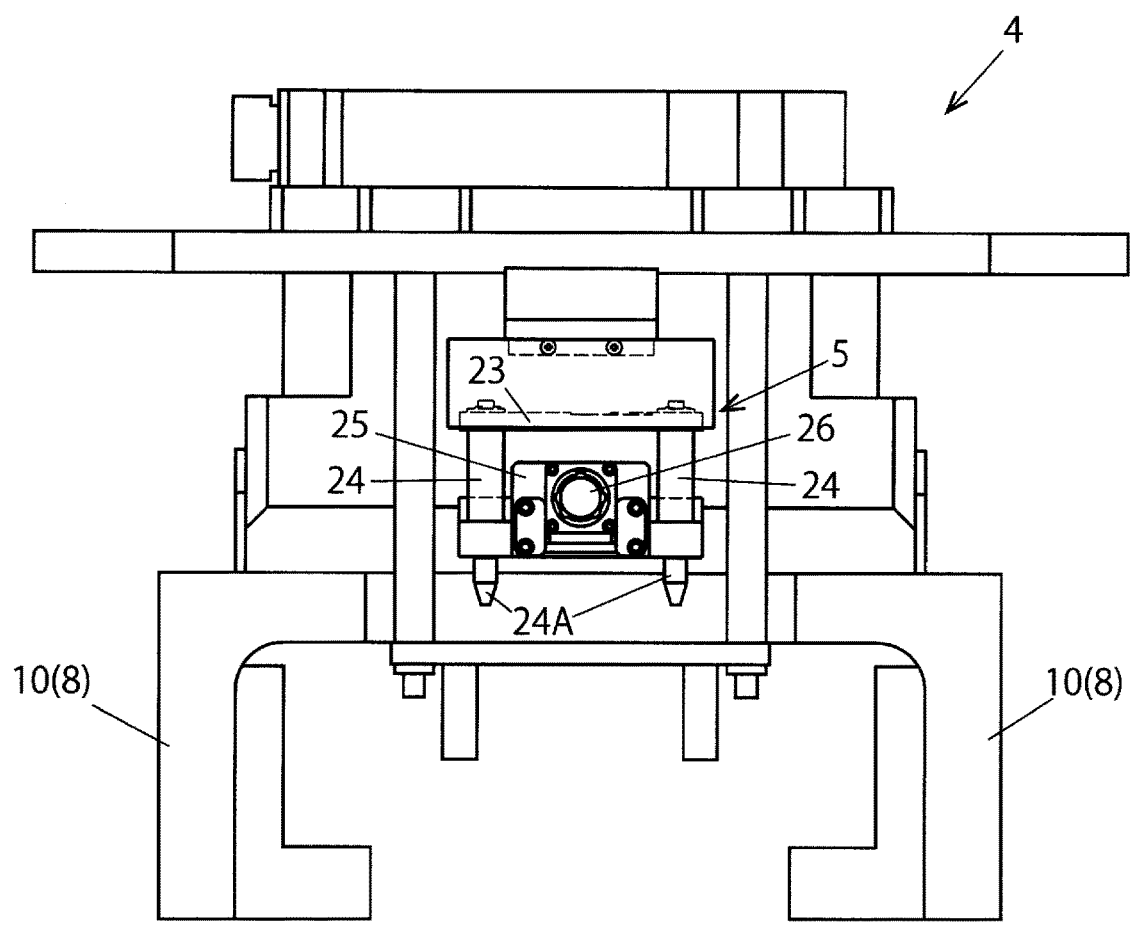
FIG. 6A is a plan view illustrating a state that the robot side contact jig illustrated in FIG. 5A is mounted to an end effector.
Figure 6B:
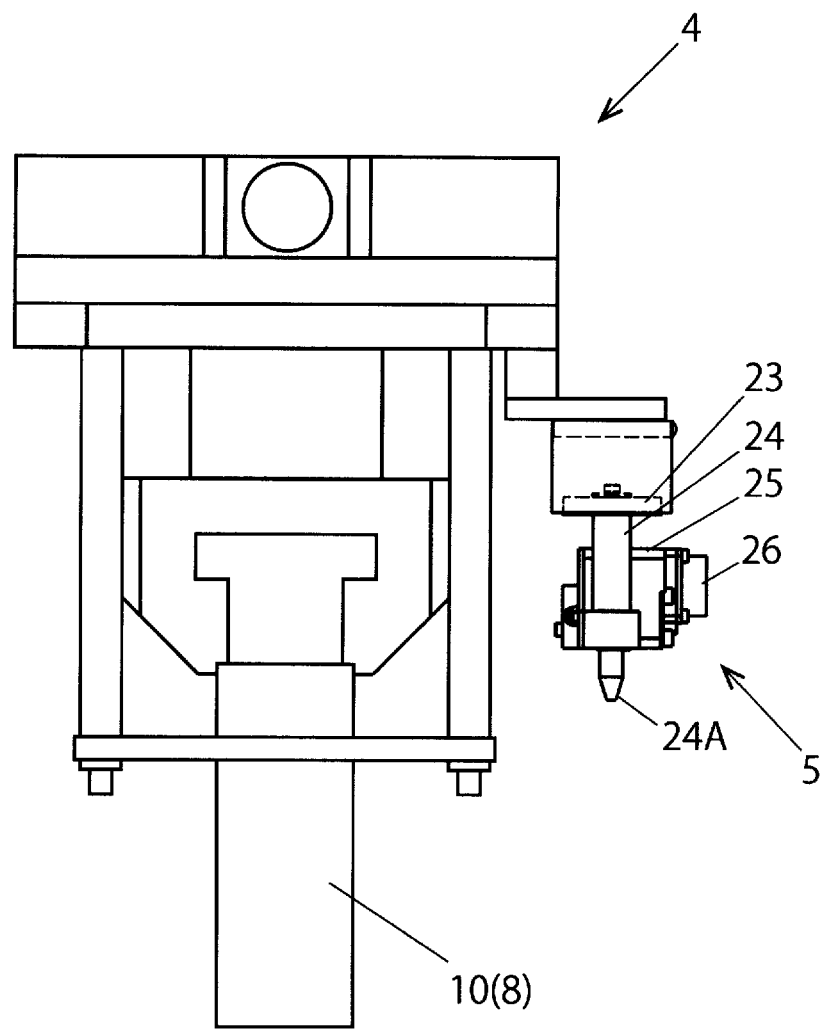
FIG. 6B is a side view illustrating the state that the robot side contact jig illustrated in FIG. 5A is mounted to the end effector.
Figure 6C:
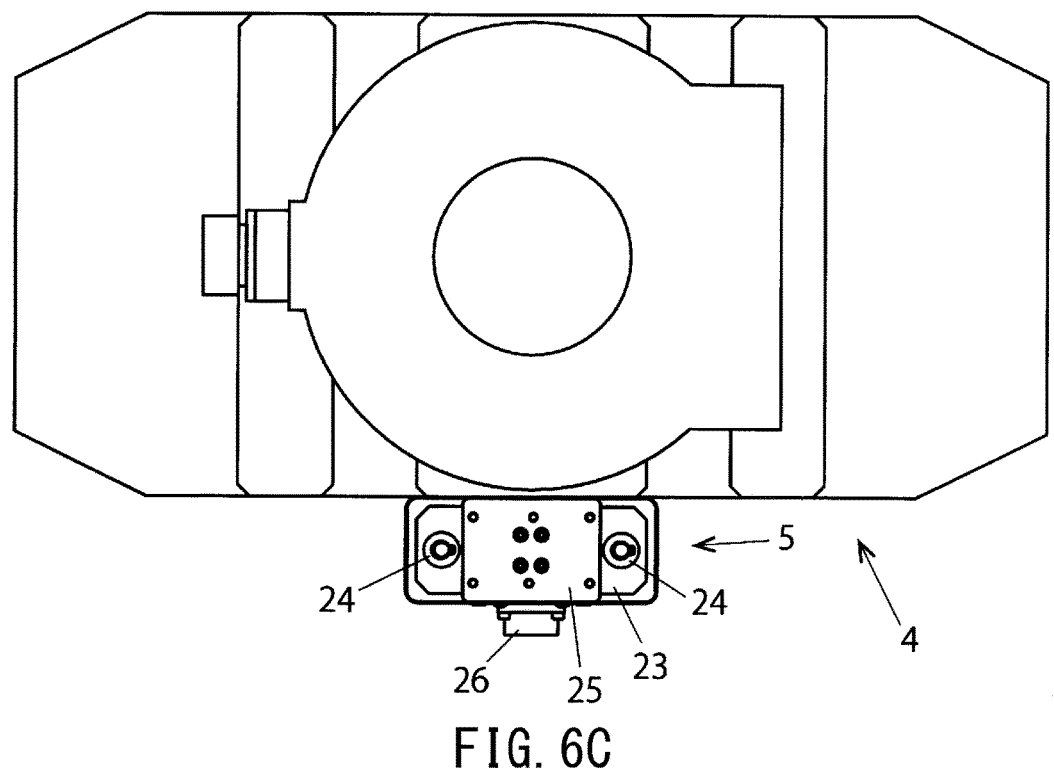
FIG. 6C is a plan view illustrating the state that the robot side contact jig illustrated in FIG. 5A is mounted to the end effector.
Figure 6D:
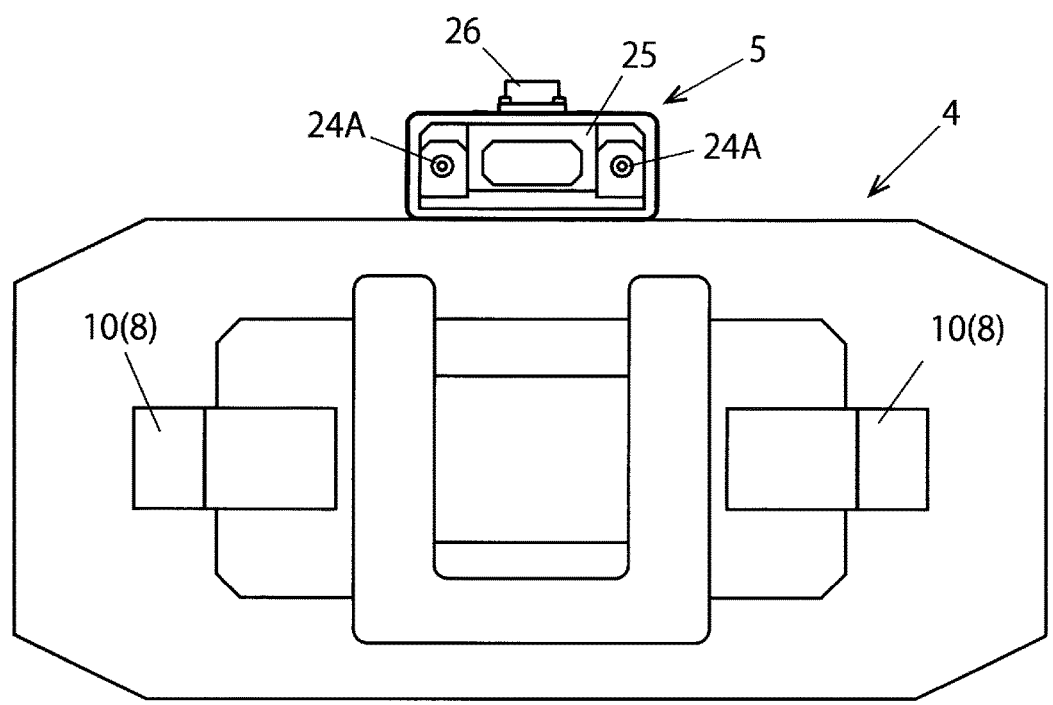
FIG. 6D is a bottom view illustrating the state that the robot side contact jig illustrated in FIG. 5A is mounted to the end effector.

As illustrated in FIG. 1 and FIG. 2, a motor mounting device 1 according to this embodiment comprises a robot side contact jig 5 provided to an end effector 4 mounted to an arm 3 of a work robot 2, and a motor side contact jig (electric apparatus side contact jig) 7 detacheably provided to a servo motor 6 as an object to be conveyed.

The end effector 4 has a motor grasping mechanism 8 for releasably grasping the servo motor 6. The motor grasping mechanism 8 has a pair of grasping claws 10 which are drive controlled by the robot controller 9 so as to be opened and closed. For example a six-axis articulated robot can be used as the work robot 2.

The robot side contact jig 5 has a robot side contact 11 electrically connected to the robot controller 9. The motor side contact jig 7 has a motor side contact (electric apparatus side contact) 12 electrically connected to an internal mechanism of the servo motor 6.

The robot side contact jig 5 and the motor side contact jig 7 are configured such that the robot side contact 11 and the motor side contact 12 are in a connected state in a state that the servo motor 6 is held by the end effector 4.

The servo motor 6 is a servo motor with the non-exciting operation type electromagnetic brake. The motor side contact 12 of the motor side contact jig 7 is electrically connected to at least a un-locking mechanism of an electromagnetic brake of the servo motor 6.

The servo motor 6 has a motor main body 13 and a motor output shaft 14 extending outward from the motor main body 13. In the motor main body 13, a bolt hole 16 though which a fixing bolt 15 for fixing the motor main body 13 to an object is formed. A gear 17 is formed on a distal end portion of a motor output shaft 14.

As illustrated in FIG. 3A to FIG. 3C and FIG. 4A to FIG. 4C, the motor side contact jig 7 has a perforated plate member 19 detachably fixed to a rear end portion of the servo motor 6 by a screw 18 and a motor side connector 21 fixed to one side of this perforated plate member 19 by a pair of L-shaped members 20.

The aforementioned motor side contact 12 is formed in a motor side connector 21. In the motor side connector 21, a pair of receiving holes 22 are formed on both sides of the motor side contact 12. The pair of receiving holes 22 act as a guide mechanism when connecting the robot side contact jig 5 to the motor side contact jig 7.

As illustrated in FIG. 5A to FIG. 5C and FIG. 6A to FIG. 6D, the robot side contact jig 5 has a base end member 23 fixed to the end effector 4, a pair of slender members 24 extending from this base end member 23, and a robot side connector 25 provided between these slender members 24. Each distal end portion 24A of the pair of slender members 24 is formed in a tapered shape.

The aforementioned robot side contact 11 is formed in the robot side connector 25. Additionally, in the robot side connecter 25, a contact port 26 to which an electric cable (not illustrated) electrically connected to the robot controller 9 is to be connected is formed.

Figure 7:
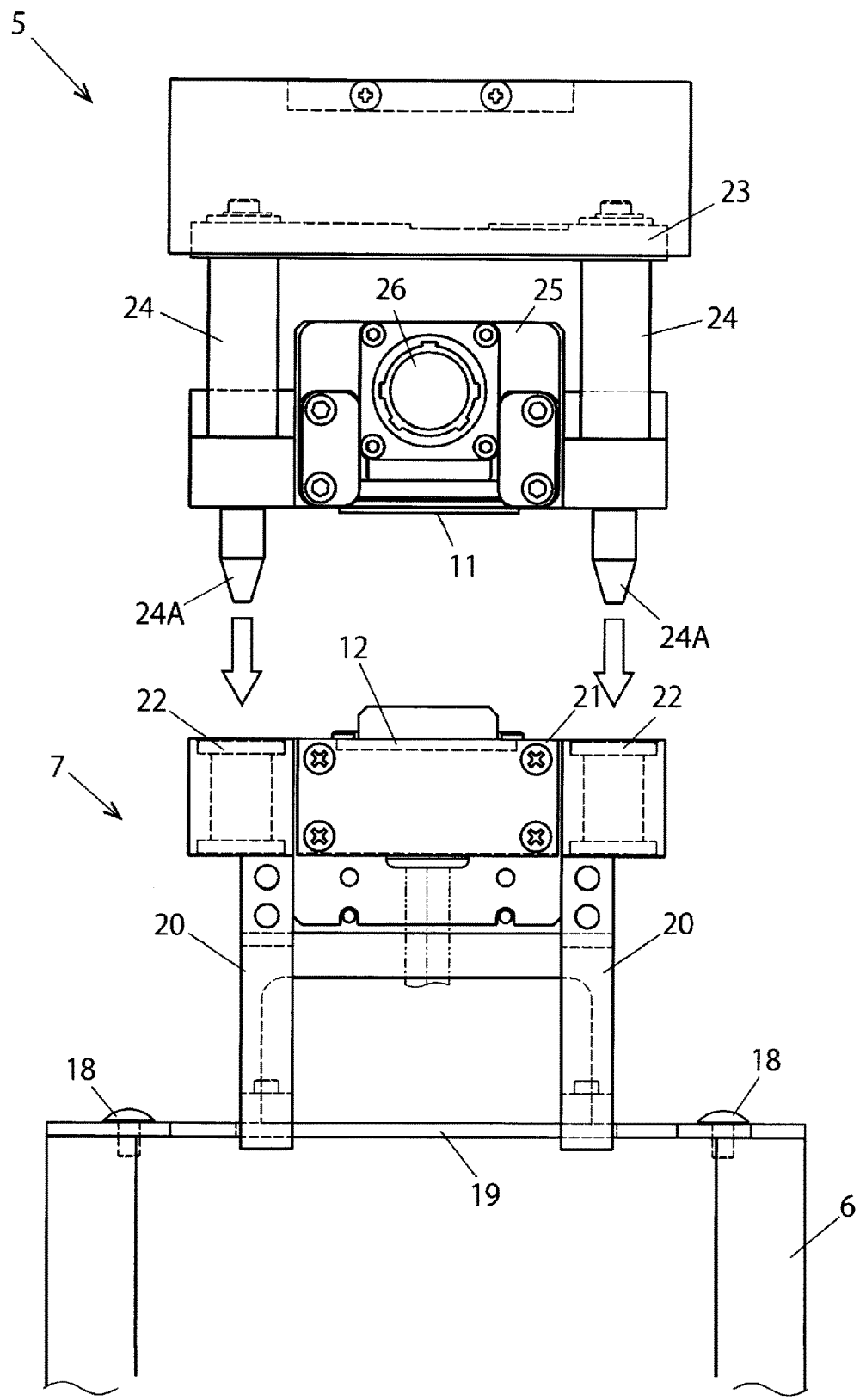
FIG. 7 is a front view illustrating the situation that the robot side contact jig of the motor mounting device illustrated in FIG. 1 is being connected to the motor side contact jig.

As illustrated in FIG. 7, the pair of slender members 24 of the robot side contact jig 5 are formed so as to be inserted into the pair of receiving holes 22 of the motor side contact jig 7. The slender member 24 of the robot side contact jig 5 has a function of positioning the robot side contact jig 5 to the motor side contact jig 7 when inserted into the receiving hole 22 of the motor side contact jig 7, since the distal end portion 24A thereof is formed in a tapered shape.

Next, a method for mounting the servo motor 6 to a given mounting position using the motor mounting device 1 according to the aforementioned embodiment will be described referring to the drawings.

In a state that the pair of grasping claws 10 of the motor grasping mechanism 8 of the end effector 4 are opened as illustrated in FIG. 1, the arm 3 of the work robot 2 is driven by the robot controller 9 so as to move the end effector 4 toward the servo motor 6 placed on a work table or the like. Note that, the motor side contact jig 7 is previously mounted to the servo motor 6 so as to be detached by the screw 18 by a worker.

When the end effector 4 is moved toward the servo motor 6, the pair of slender members 24 of the robot side contact jig 5 are inserted into the pair of receiving holes 22 of the motor side contact jig 7 exhibiting its positioning function as described referring to FIG. 7. When the pair of slender members 24 of the robot side contact jig 5 are inserted into the pair of receiving holes 22 of the motor side contact jig 7, the robot side contact 11 of the robot side contact jig 5 and the motor side contact 12 of the motor side contact jig 7 are connected (contact connecting step) as illustrated in FIG. 8A.

Figure 8A:
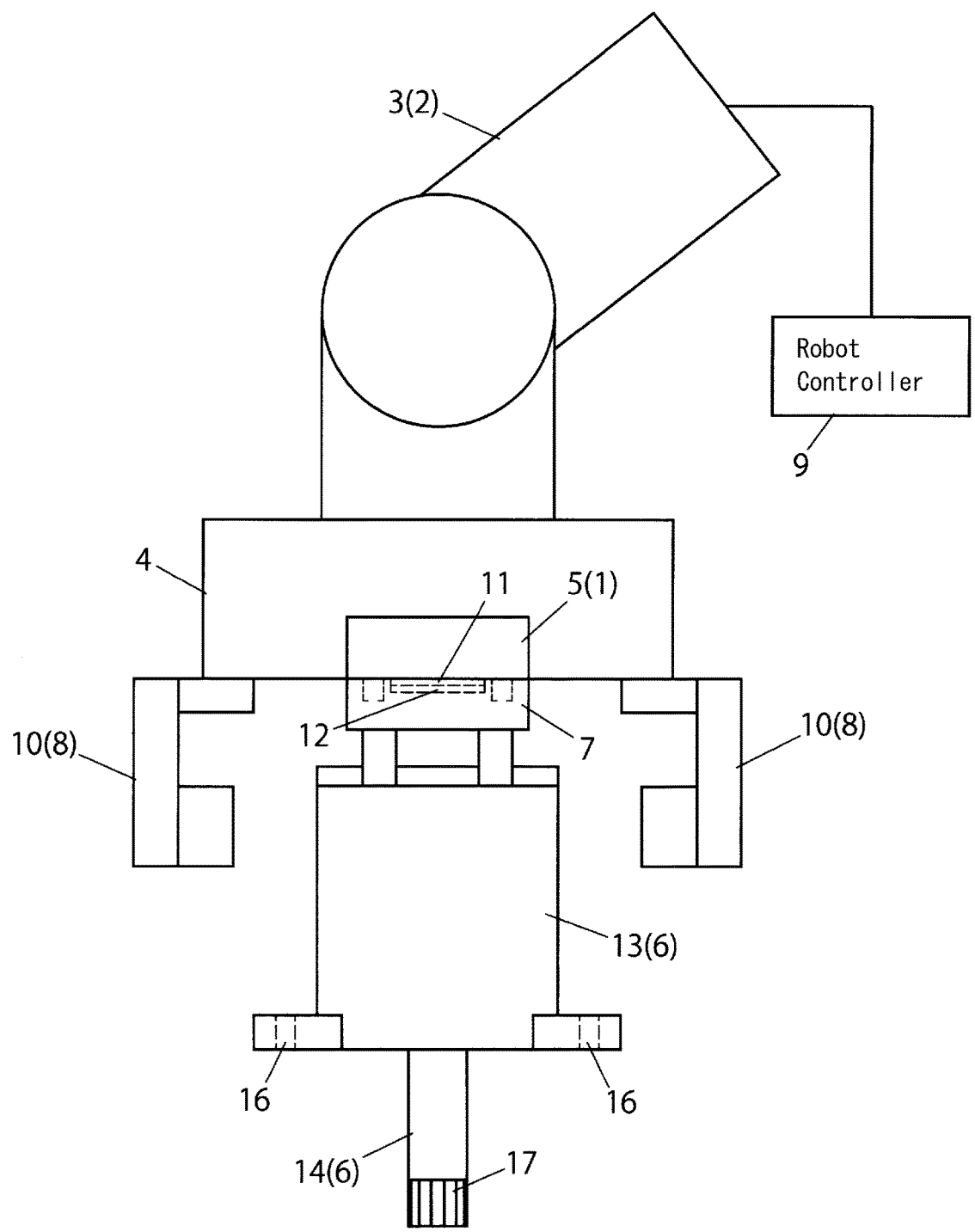
FIG. 8A is a front view illustrating a state that the robot side contact jig of the motor mounting device illustrated in FIG. 1 is connected to the motor side contact jig.

From the state illustrated in FIG. 8A, the end effector 4 is driven by the robot controller 9 so as to switch its pair of grasping claws 10 from the open state to a closed state. Thereby, as illustrated in FIG. 8B, the servo motor 6 is grasped by the pair of grasping claws 10 of the end effector 4.

As mentioned above, in the motor mounting method using the motor mounting device 1 according to this embodiment, in a series of operations of moving the end effector 4 to a position where the servo motor 6 to be conveyed is placed so as to grasp the same, the connection of the robot side contact 11 of the robot side contact jig 5 and the motor side contact 12 of the motor side contact jig 7 is finished.

Figure 8B:
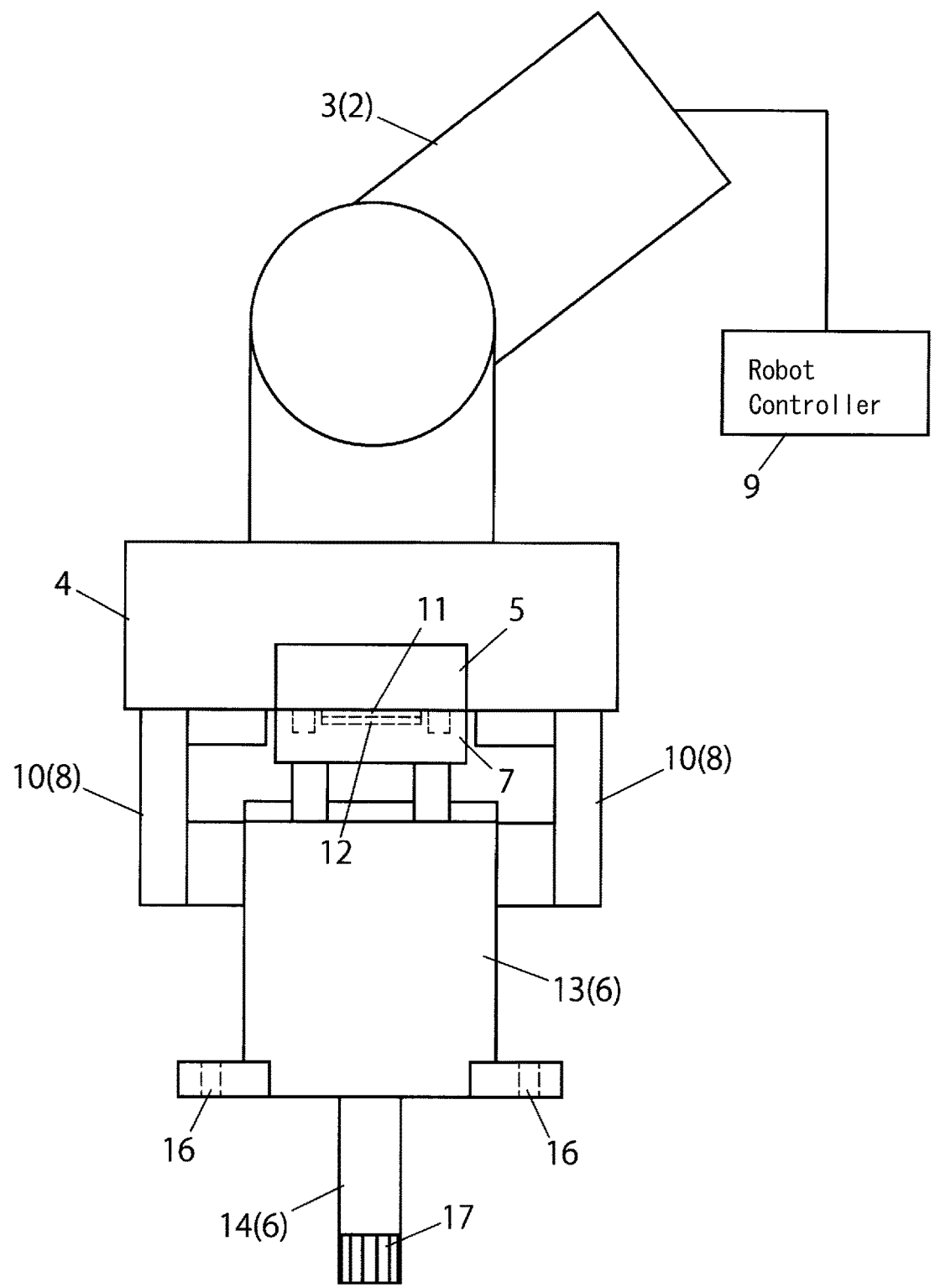
FIG. 8B is a front view illustrating a state that the end effector is driven from the state illustrated in FIG. 8A and the servo motor is grasped by the end effector.
Figure 8C:
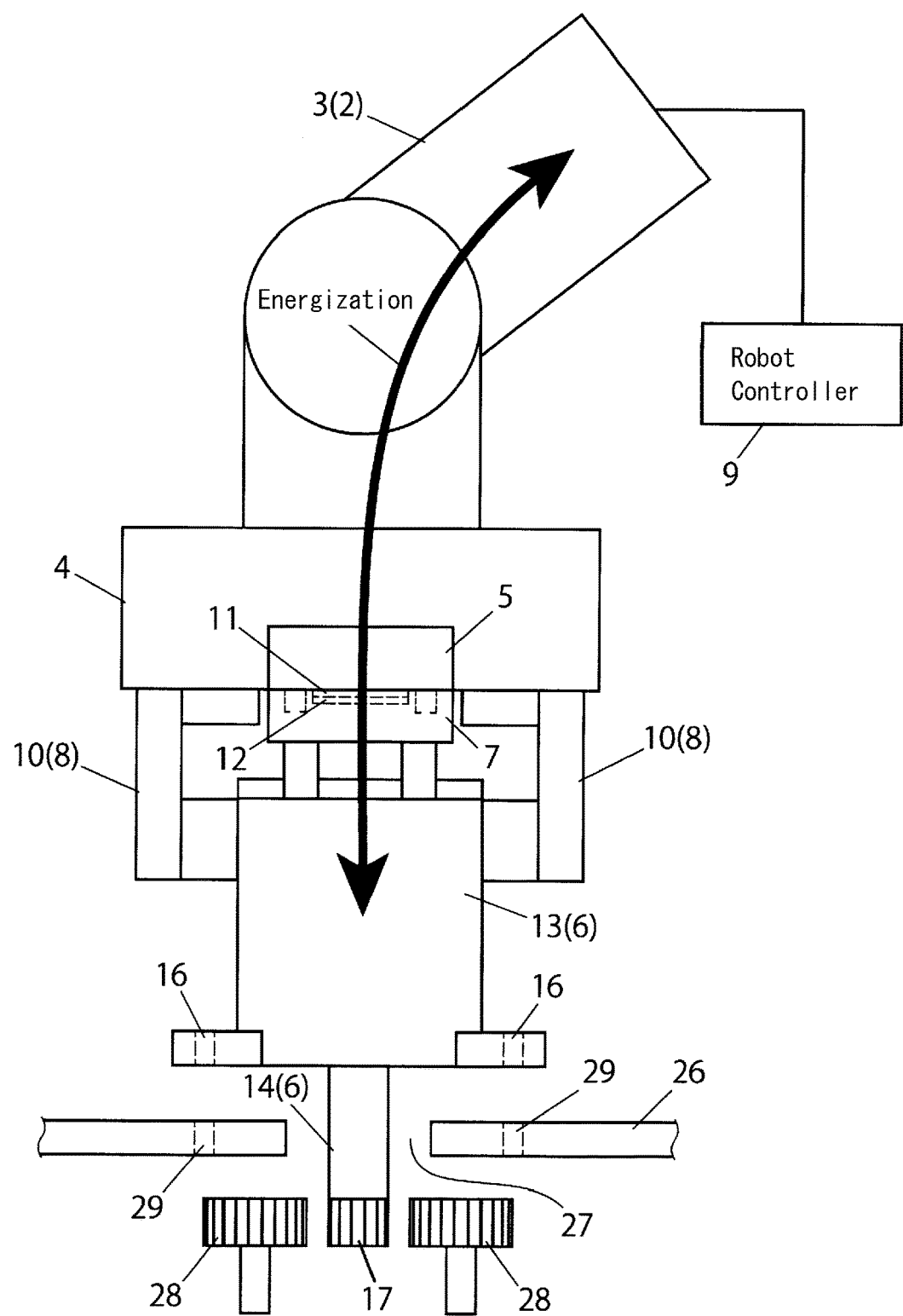
FIG. 8C is a front view illustrating a state that the robot is driven from the state illustrated in FIG. 8B and the servo motor is conveyed to a given mounting position by the robot.

After grasping the servo motor 6 by the end effector 4 as illustrate in FIG. 8B, the work robot 2 is driven by the robot controller 9 so as to convey the servo motor 6 and position the servo motor 6 in a given position of a product in production as illustrated in FIG. 8C (motor conveying step).

Here, in this embodiment, the servo motor 6 is mounted to a robot in production (product robot) 26 using the motor mounting device 1. Thus, the motor output shaft 14 of the servo motor 6 is inserted into an insertion hole 27 provided on the product robot 26 side, and the gear 17 formed on the motor output shaft 14 and a gear 28 on the drive shaft side of the product robot 26 are engaged with each other.

Next, power from the robot controller 9 is supplied to the robot side contact 11 of the robot side contact jig 5 and the power is supplied to the servo motor 6 via the motor side contact 12 of the motor side contact jig 7 (power supplying step). Thereby, and electromagnetic brake of the servo motor 6 is un-locked.

In the state that the electromagnetic brake of the servo motor 6 is un-locked, the work robot 2 is driven by the robot controller 9 so as to rotate the motor main body 13 of the servo motor 6 about the motor output shaft 14. Thereby, the fixing bolt hole 16 formed in the motor main body 13 is positioned to a screw hole 29 formed on the product robot side (motor main body positioning step).

At this time, the motor output shaft 14 is in a state that it can be freely rotated relative to the motor main body 13, since the electromagnetic brake of the servo motor 6 is previously un-locked. Therefore, even when the motor main body 13 is rotated by the work robot 2, its rotational force is not transmitted to the motor output shaft 14, and an excessive force is not applied on the product robot 26 side even though the attitude of the product robot 26 in production is firmly fixed.

As stated above, by the motor mounting device 1 and method according to this embodiment, power can be supplied to the servo motor 6 grasped by the end effector 4 via the robot side contact 11 of the robot side contact jig 5 and the motor side contact 12 of the motor side contact jig 7, and therefore the electromagnetic brake of the servo motor 6 can be un-locked as necessary. Thereby, even in a state that the gear 17 of the motor output shaft 14 is engaged with the gear 28 on the drive shaft side of the product robot 26, positioning of the motor main body 13 about the axis of the motor output shaft 14 can be performed without hindrance.

Additionally, since the electromagnetic brake of the servo motor 6 can be un-locked using the robot controller 9 as power supply in this embodiment, it is not necessary to prepare an exclusive power supply for un-locking the electromagnetic brake. Thereby, the structure of the motor mounting device 1 can be simplified.

Additionally, in this embodiment, power supplied to the servo motor 6 via the robot side contact 11 and the motor side contact 12 is to un-lock the electromagnetic brake of the servo motor 6, and it is extremely smaller than power for driving the servo motor. Therefore, a thin electric cable to be connected to the robot side contact member 5 will suffice, and accordingly the electric cable is easily pulled around.

Note that, as a variation of the aforementioned embodiment, not only power for un-locking the electromagnetic brake of the servo motor 6 but also power for rotatively driving the servo moto 6 may be supplied via the robot side contact 11 of the robot side contact jig 5 and the motor side contact 12 of the motor side contact jig 7 so as to send and receive a control signal.

In such as configuration, after mounting the servo motor 6 to the product robot 26 in production, the power and control signal are supplied to the servo motor 6 via the robot side contact 11 and the motor side contact 12 so as to rotatively control the servo motor 6. Thereby, the attitude of the product robot 26 in production can be changed to an attitude suitable for a work then.

Note that, although the case when the product robot is produced using the work robot is described as an example in the aforementioned embodiment, the electric apparatus mounting device and method according to the present invention can be applied to production of a product other than the product robot.

Additionally, although the case when the motor is mounted to a given position using the work robot is described as an example in the aforementioned embodiment, the electric apparatus mounting device and method according to the present invention can be applied to mounting of an electric apparatus other than the motor.

DESCRIPTION OF REFERENCE NUMERALS

1 . . . motor mounting device (electric apparatus mounting device)
2 . . . work robot
3 . . . arm of work robot
4 . . . end effector
5 . . . robot side contact jig
6 . . . servo motor (electric apparatus)
7 . . . motor side contact jig (electric apparatus contact jig)
8 . . . motor grasping mechanism of end effector
9 . . . robot controller of work robot
10 . . . grasping claw of motor grasping mechanism
11 . . . robot side contact
12 . . . motor side contact (electric apparatus side contact)
13 . . . motor main body
14 . . . motor output shaft
15 . . . fixing bolt of servo motor
16 . . . bolt hole of servo motor
17 . . . gear of motor output shaft
18 . . . screw of motor side contact jig
19 . . . perforated plate member of motor side contact jig
20 . . . L-shaped member
21 . . . motor side connector
22 . . . receiving hole of motor side contact jig
23 . . . base end member of robot side contact jig
24 . . . slender member of robot side contact jig
24A . . . distal end portion of slender member
25 . . . robot side connector
26 . . . product robot
27 . . . insertion hole of product robot
28 . . . gear of drive shaft of product robot
29 . . . screw hole on product robot side

The invention claimed is:

1. An electric apparatus mounting device for conveying and mounting an electric apparatus to a given position using a robot, comprising:
    an robot side contact jig which is provided to an end effector mounted to an arm of the robot and which has a robot side contact; and
    an electric apparatus side contact jig which is detachably provided to the electric apparatus and which has an electric apparatus side contact electrically connected with the electric apparatus,
    wherein the robot side contact jig and the electric apparatus side contact jig are configured such that the robot side contact and the electric apparatus side contact are in a connection state in a state that the electric apparatus is held by the end effector.

2. The electric apparatus mounting device according to claim 1, wherein the electric apparatus includes a motor.

3. The electric apparatus mounting device according to claim 2, wherein the electric apparatus side contact is electrically connected to an electromagnetic brake of the motor.

4. The electric apparatus mounting device according to claim 3,
    wherein the electromagnetic brake is a non-exciting operation type electromagnetic brake, and
    wherein the robot side contact is electrically connected to a power source for supplying a power for un-locking the non-exciting operation type electromagnetic brake.

5. The electric apparatus mounting device according to claim 2, wherein the electric apparatus side contact is electrically connected to a rotational drive mechanism of the motor.

6. The electric apparatus mounting device according to claim 1, wherein the robot side contact is electrically connected to a controller of the robot.

7. An electric apparatus mounting method of conveying and mounting an electric apparatus to a given position using a robot, comprising:
    a contact connecting step of driving the robot so as to connect a robot side contact of a robot side contact jig provided to an end effector mounted to an arm of the robot to an electric apparatus side contact of an electric apparatus side contact jig detachably provided to the electric apparatus;
    a motor conveying step of driving the robot so as to convey the electric apparatus held by the end effector; and
    a power supplying step of supplying a power from a power supply electrically connected to the robot side contact to the electric apparatus.

8. The electric apparatus mounting method according to claim 7,
    wherein the electric apparatus includes a motor, and
    wherein an electromagnetic brake of the motor is un-locked by the power supplying step.

9. The electric apparatus mounting method according to claim 8, further comprising a motor main body positioning step of driving the robot after un-locking the electromagnetic brake of the motor by the power supplying step and rotating a main body of the motor about an axis of an output shaft of the motor so as to position the main body of the motor.

10. The electric apparatus mounting method according to claim 7, wherein the power supply in the power supplying step is provided by a controller of the robot.

11. The electric apparatus mounting device according to claim 3, wherein the electric apparatus side contact is electrically connected to a rotational drive mechanism of the motor.

12. The electric apparatus mounting device according to claim 4, wherein the electric apparatus side contact is electrically connected to a rotational drive mechanism of the motor.

13. The electric apparatus mounting device according to claim 2, wherein the robot side contact is electrically connected to a controller of the robot.

14. The electric apparatus mounting device according to claim 3, wherein the robot side contact is electrically connected to a controller of the robot.

15. The electric apparatus mounting device according to claim 4, wherein the robot side contact is electrically connected to a controller of the robot.

16. The electric apparatus mounting device according to claim 5, wherein the robot side contact is electrically connected to a controller of the robot.

17. The electric apparatus mounting device according to claim 11, wherein the robot side contact is electrically connected to a controller of the robot.

18. The electric apparatus mounting device according to claim 12, wherein the robot side contact is electrically connected to a controller of the robot.

19. The electric apparatus mounting method according to claim 8, wherein the power supply in the power supplying step is provided by a controller of the robot.

20. The electric apparatus mounting method according to claim 9, wherein the power supply in the power supplying step is provided by a controller of the robot.

* * * * *